Patented Aug. 21, 1934

1,971,319

UNITED STATES PATENT OFFICE

1,971,319

PROCESS OF TREATING ALUNITE

Harry G. Wildman, Westmount, Quebec, Canada, assignor of one-half to Carl H. Fowler, New York, N. Y.

No Drawing. Application April 17, 1931, Serial No. 531,009. Renewed March 31, 1934

1 Claim. (Cl. 23—121)

My invention relates to a process of treating alunite for the recovery of potash and/or alumina.

My process will be described as applied to a relatively pure alunite, with the understanding, however, that the principles are applicable to impure alunite.

Heretofore in the treatment of alunite for the recovery of potash, it has been usual to roast the rock to drive off the sulphur and thereafter leach out the potash. Some aluminium sart are usually leached out with the potash and must thereafter be separated. The process of the prior art is relatively expensive and inefficient, and large residues result which are of little or no commercial value.

It is the principal object of my invention to provide a process, which is simple to carry out, cheap and efficient.

Briefly stated, in the preferred form of carrying out my process, the alunite is dissolved, the aluminum precipitated from the solution and then filtered or otherwise separated from the solution. From the filtrate the potash is separated preferably by concentrating the filtrate and crystallizing out the potash.

In carrying out the process, the alunite is preferably ground, in order to hasten the step of dissolving the same. The ground alunite is then dissolved in a caustic alkali, preferably caustic potash, though other caustic alkalies, such as caustic soda, lithium hydroxide and ammonium hydroxide may be employed. I have found that with caustic potash, the alunite is quite readily dissolved, if a substantial excess of potash is employed, and with the application of heat. I have employed a quantity of concentrated caustic potash solution about equal in weight to the weight of the ground alunite and secured excellent results. The mixture of alunite and caustic potash solution is preferably heated as by means of live steam or a steam coil, so as to hasten the reaction.

After the alunite has been dissolved, if there is any substantial amount of undissolved matter such as silica or other residue, the solution is preferably filtered. The alumina is then precipitated from the solution preferably by treating with carbon dioxide, so as to precipitate the alumina as aluminum hydroxide. The precipitation of alumina may be otherwise effected, for example, by the addition of aluminum hydroxide from the previous batch. Precipitating by the latter method is however imperfect, and precipitation by treatment with carbon dioxide is much to be preferred.

The precipitated aluminum hydroxide is then separated from the solution as by filtering. The aluminum hydroxide, if desired, may then be ignited to form the oxide.

If there is any dissolved silica in the solution, it may be removed by the addition of a small amount of lime and then filtering. The potash in the form of potassium sulphate is then separated from the filtrate as by evaporating the same, so as to cause the potassium sulphate to crystallize out. The solution is not concentrated to the extent where a substantial amount of any potassium carbonate present is crystallized out. The mass of crystals thus produced is relatively pure potassium sulphate. The crystals are then separated from the solution as by filtering.

The filtrate is then treated for the recovery of caustic potash to be used over again in the first step of the process. By the addition of lime (which may have been produced by the burning of limestone to produce the carbon dioxide for one of the steps in the process) to the filtrate the caustic potash is then recovered and may be used over again as stated in the first step of the process.

Relatively impure alunites may be treated as above described for the recovery of potash and/or alumina.

The process is simple, cheap to carry out and very efficient.

While the invention has been described in considerable detail, I wish it understood that various changes, omissions and additions may be made within the scope of the invention as defined in the appended claim.

I claim:

The wet process of treating alunite for recovery of alumina and potash, which comprises grinding the alunite, treating with an excess of caustic potash solution until dissolved, filtering the solution to remove any undissolved residue, precipitating aluminum hydroxide from the filtrate by treating with carbon dioxide, filtering out the aluminum hydroxide from the solution, evaporating the filtrate to crystallize out potassium sulfate, filtering the solution to remove potassium sulfate, and then treating the filtrate with lime to recover the caustic potash.

HARRY G. WILDMAN.